(12) United States Patent
Reeves, Jr.

(10) Patent No.: US 7,581,341 B1
(45) Date of Patent: Sep. 1, 2009

(54) WHEEL LOADER

(76) Inventor: James B. Reeves, Jr., 1315 Whitman Dr., Glen Burnie, MD (US) 21061

( * ) Notice: Subject to any disclaimer, the term of this patent is extended or adjusted under 35 U.S.C. 154(b) by 0 days.

(21) Appl. No.: 12/153,766

(22) Filed: May 23, 2008

(51) Int. Cl.
*E02F 3/28* (2006.01)

(52) U.S. Cl. .............................. 37/442; 37/443; 37/444; 37/411; 37/435; 180/14.2; 280/442

(58) Field of Classification Search ........... 37/442–445, 37/379, 411, 435; 180/311, 14.1, 14.2, 89.13, 180/9.4, 9.42; 280/781, 785
See application file for complete search history.

(56) References Cited

U.S. PATENT DOCUMENTS

| | | | | |
|---|---|---|---|---|
| 2,444,944 A * | 7/1948 | Minter | ..................... | 280/456.1 |
| 3,168,927 A * | 2/1965 | Garner | ...................... | 180/6.48 |
| 3,215,219 A * | 11/1965 | Forsyth et al. | ............. | 180/14.3 |
| 3,390,735 A * | 7/1968 | Medley et al. | ........... | 180/24.06 |
| 3,526,329 A * | 9/1970 | Stedman et. al. | ............. | 414/697 |
| 3,545,633 A * | 12/1970 | Lundberg | .................... | 414/734 |
| 3,606,051 A * | 9/1971 | Peterson et al. | ............. | 414/697 |
| 3,635,365 A * | 1/1972 | Bauer | .......................... | 414/715 |
| 3,658,198 A * | 4/1972 | Keskitalo | ..................... | 414/697 |
| 3,690,395 A * | 9/1972 | Spiller et al. | ............... | 180/6.48 |
| 3,765,553 A * | 10/1973 | Schaeff | ....................... | 414/694 |
| 3,814,272 A * | 6/1974 | Spratt | .......................... | 414/629 |
| 3,866,781 A * | 2/1975 | Stedman et al. | ............. | 414/715 |
| 3,885,643 A * | 5/1975 | Goodbary | .................. | 180/89.13 |
| 3,937,345 A * | 2/1976 | Countryman | ............... | 414/492 |
| 4,239,444 A * | 12/1980 | Schmelzer | .................... | 414/685 |
| 4,266,625 A * | 5/1981 | Garner et al. | ............... | 180/6.48 |
| 4,285,627 A * | 8/1981 | Oswald et al. | ............... | 414/694 |
| 4,395,193 A * | 7/1983 | Christensen et al. | ........ | 414/722 |
| 4,407,381 A * | 10/1983 | Oswald et al. | ............. | 180/6.48 |
| 4,782,906 A * | 11/1988 | Kole | ............................ | 180/23 |
| 4,790,711 A * | 12/1988 | Calaway | ..................... | 414/635 |
| 4,799,564 A * | 1/1989 | Iijima et al. | ................. | 180/65.5 |
| 5,205,587 A * | 4/1993 | Orr | ............................. | 280/785 |
| 5,210,965 A * | 5/1993 | Funk et al. | ..................... | 37/454 |
| 5,295,318 A * | 3/1994 | Schaeff | ........................ | 37/379 |
| 5,476,285 A * | 12/1995 | Dickerson | .................... | 280/781 |
| 6,880,651 B2 * | 4/2005 | Loh et al. | ................... | 180/14.2 |
| 6,938,514 B1 * | 9/2005 | Crane et al. | ................. | 74/571.1 |
| 7,004,275 B1 * | 2/2006 | Junga et al. | ............... | 180/89.13 |
| 7,036,622 B2 * | 5/2006 | Iwaki | .......................... | 180/311 |
| 7,124,853 B1 * | 10/2006 | Kole, Jr. | ...................... | 180/312 |
| 7,147,073 B2 * | 12/2006 | Mollhagen | .................. | 180/65.5 |
| 7,204,546 B2 * | 4/2007 | Antonetti | ............... | 296/190.04 |
| 7,318,580 B2 * | 1/2008 | Johnston et al. | ............. | 254/362 |
| 2006/0150447 A1 * | 7/2006 | Bates | ........................... | 37/443 |
| 2006/0191168 A1 * | 8/2006 | Casey et al. | ..................... | 37/348 |
| 2008/0099282 A1 * | 5/2008 | Boroski et al. | ............... | 187/203 |

\* cited by examiner

*Primary Examiner*—Thomas A Beach
*Assistant Examiner*—Matthew R Buck
(74) *Attorney, Agent, or Firm*—Robert E. Bushnell, Esq.

(57) ABSTRACT

A design for a wheel loader. The wheel loader has two units connected back to back via a pivot. Each unit has a base unit that is easily disassembled into parts no more than 8 feet wide for transport by using steel plates connected by sleeves, shafts and nuts. A dipper arm arrangement connects the base to a high capacity bucket arrangement of 300 cubic yards. Hydraulic cylinders raise and lower the bucket arrangement and tip the bucket arrangement for dumping. The hydraulic cylinders are operated by hydraulic pumps which are operated by diesel engines. A rotatable cab sits on top of the base to provide a view for an operator.

19 Claims, 7 Drawing Sheets

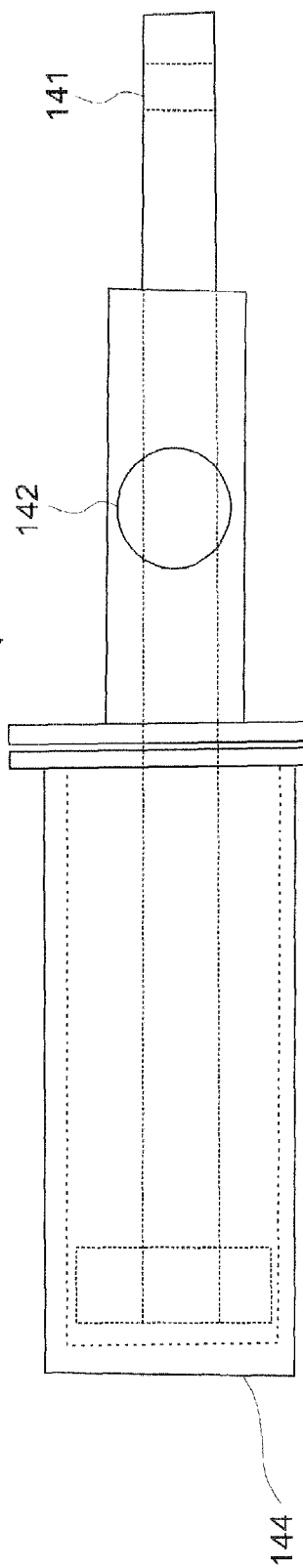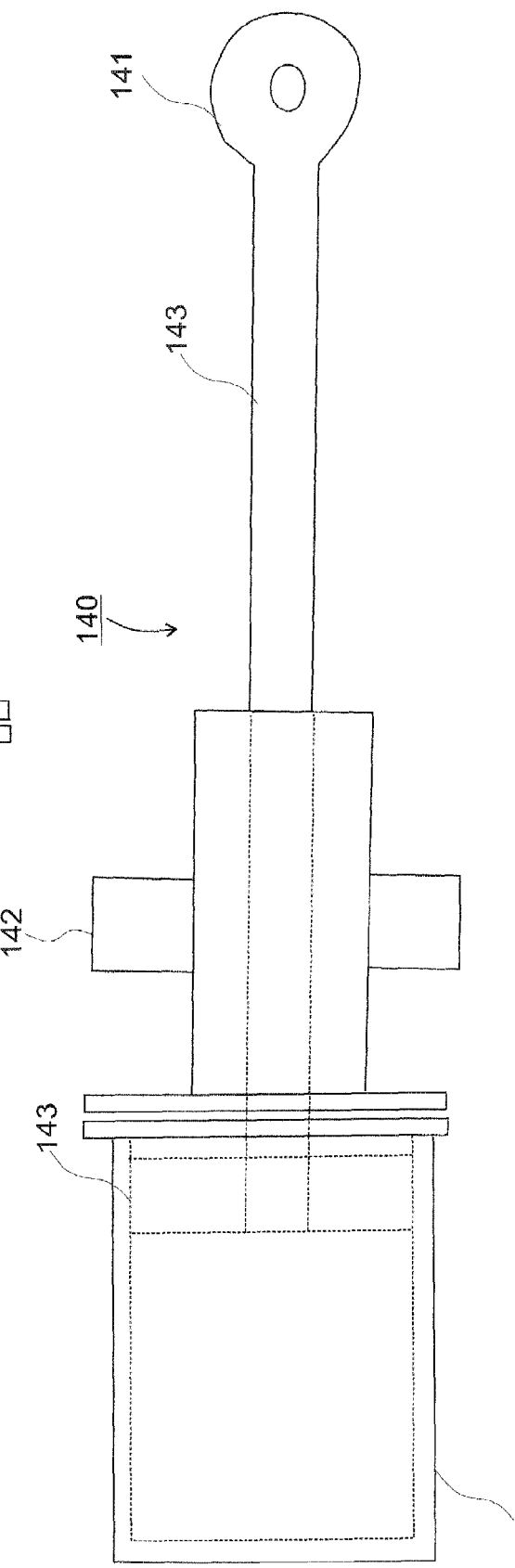

WHEEL LOADER

BACKGROUND OF THE INVENTION

1. Field of the Invention

The present invention relates to a design for a large capacity wheel loader, the wheel loader also having a rotatable cab, a hydraulically pivotable bucket arrangement, as well as a design allowing for the disassembly of the wheel loader into small pieces for transport.

2. Description of the Related Art

Wheel loaders are used in mining operations to move material such as coal, rock, iron ore and sand oil. Currently the largest wheel loader 1 am aware of is the L-2350 by LeToureau, Inc. The L-2350 can lift up to 85 cubic yards of coal in its bucket. The L-2350 provides an operating payload of 160,000 lbs, has a 24 foot lift height, an 11.5 foot reach, has a 2300 horsepower Detroit Diesel engine.

However, the L-2350 has the following drawbacks. Because of its welded construction, the L-2350 can not be disassembled into small pieces for transport. Since the L-2350 is a large and bulky machine, moving the L-2350 becomes difficult. Also, there is a need for a larger bucket size in applications like in oil sand extraction and in coal mining. For example, there is a need for a very large capacity loader that can be used to load oil sand in places like the Athabasca oil sands near Fort McMurray, Alberta Canada. These oil sands contain bitumen, and if upgraded, can produce synthetic crude oil. In this oil sand operation, what is needed is a wheel loader with a large capacity and that can be operated with just one operator.

The current L-2350 is greatly limited due to its limited capacity. Also, the four wheel design in the L-2350 is insufficient as wheels often spin and are unable to obtain good traction. What is therefore needed is a wheel loader with a much larger capacity than the L-2350, that has good traction and is capable of moving more material in a shorter length of time using just one operator. This needed wheel loader needs to be suitable for the removal of a large amount of surface material, coal from a coal mine or tar sand or oil sand from the Athabasca, and would be able to remove a larger amount of material quicker and with less cost than current wheel loaders.

SUMMARY OF THE INVENTION

It is therefore an object of the present invention to provide an improved design for a wheel loader.

It is also an object of the present invention to provide a design for a wheel loader with a very wide bucket arrangement and a very large bucket capacity.

It is also an object of the present invention to provide a novel mechanism for dumping the bucket arrangement and for raising and lowering the bucket arrangement.

It is still an object of the present invention to provide a design for a wheel loader where the cab enables a single operator to get a good view of the extremely large sized and large capacity wheel loader.

It is yet an object of the present invention to provide for a larger wheel loader where the wheel loader can be disassembled into smaller parts no larger than 8 feet wide for transport.

It is still an object of the present invention to provide a wheel loader with a different wheel design that provides for better traction and steering.

It is further an object of the present invention to provide a cab arrangement for an operator where the cab is rotatable, is sufficiently high and has an elevator to get to and from the cab.

According to one aspect of the present invention, there is provided a wheel loader that includes a base unit, a plurality of wheels arranged underneath the base unit, a bucket arrangement and a dipper arm arrangement including a plurality of dipper arms, each of the dipper arms having a proximal end and a distal end, the proximal end of each of the dipper arms being attached to the base unit and the distal end of the dipper arms being attached to the bucket arrangement.

The bucket arrangement can include a plurality of bucket units, each bucket unit being 25 feet deep, the bucket arrangement having a capacity of 150 cubic yards. The bucket arrangement can include 4 bucket units. The plurality of dipper arms can be operated by a corresponding number of hydraulic cylinders driven by a plurality of hydraulic pumps. The plurality of wheels can be 7 wheels. Each of the plurality of wheels can include an electric gear reduction motor within. The wheel loader can also include a cab mounted on a top side of the base unit, the cab being rotatable with respect to the base unit. The cab can include an 8 inch shaft extending from a bottom of a cab floor plate and into an 8 inch aperture in a cab base plate arranged on the base unit. The base unit can be 50 feet by 40 feet and being adapted to be disassembled into pieces no more than 8 feet wide. The wheel loader can also include a plurality of hydraulic cylinders extending from the dipper arms to the bucket arrangements and adapted to dump a contents of the bucket arrangement.

The base unit can be 50 feet wide and can include a plurality of steel plates arranged in parallel with each other, each of said steel plates being perforated by a plurality of apertures, a plurality of shafts extending through the apertures of each of said plurality of steel plates, a plurality of sleeves arranged about the plurality of shafts and adapted to maintain a space between adjacent ones of the plurality of steel plates and a plurality of nuts adapted to fasten the shafts to the steel plates with the sleeves arranged therebetween. The wheel loader can also include a first set of hydraulic cylinders extending from the base unit to the dipper arms and adapted to raise and lower the dipper arms and the bucket arrangement, and a second set of hydraulic cylinders extending from the dipper arms to the bucket arrangement and adapted to dump contents of the bucket arrangement by rotating the bucket arrangement.

According to another aspect of the present invention, there is provided a wheel loader that includes two units attached to each other by a coupler pivot, each of said two units can include a base unit, a plurality of wheels arranged underneath the base unit, a bucket arrangement and a plurality of dipper arms, each of the dipper arms having a proximal end and a distal end, the proximal end of each of the dipper arms being attached to the base unit and the distal end of each of the dipper arms being attached to the bucket arrangement. Each unit can also include a cab mounted on the base, the cab extending 40 feet above a bottom of the wheels. The bucket arrangement of each unit can be on an opposite side of a corresponding base unit from the coupler pivot.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 5A and 5B are views of the hydraulic cylinder used to raise and lower the dipper arms of the wheel loader of FIG. 1 according to an embodiment of the present invention;

DETAILED DESCRIPTION OF THE INVENTION

Figure 1:
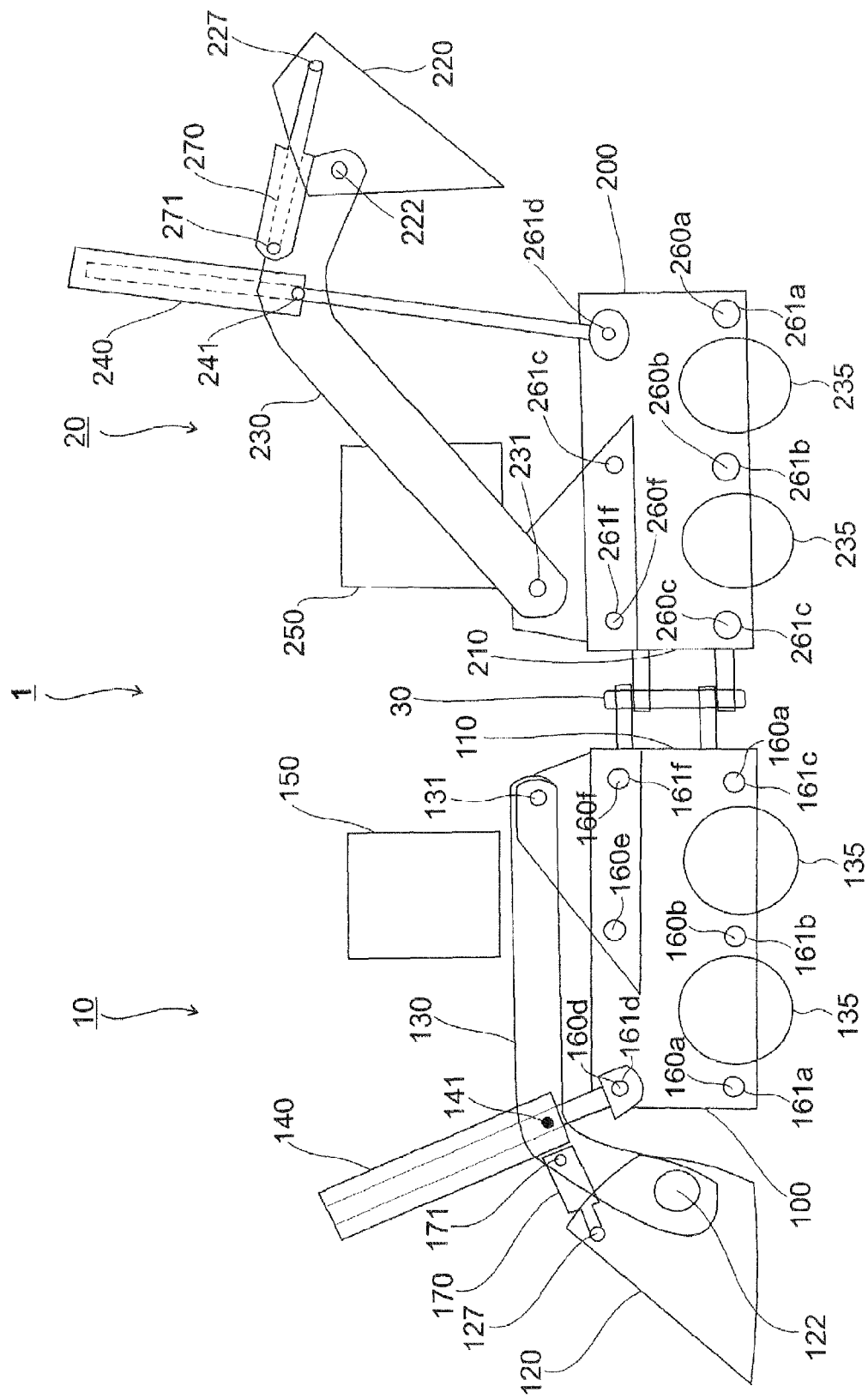
FIG. 1 is a side view of a wheel loader according to an embodiment of the present invention.

Turning now to FIG. 1, FIG. 1 is a side view of a wheel loader 1 according to an embodiment the present invention. Wheel loader 1 is made up of two identical units 10 and 20, whose rear portions 110 and 210 are coupled together by coupler pivot 30. As illustrated in FIG. 1, each unit 10 and 20 has a base 100 and 200 respectively. A bucket arrangement 120 and 220 is attached to each base 100 and 200 respectively by dipper arm arrangements 130 and 230 respectively.

Wheel loader 1 can be disassembled into sections not more than 8 feet wide so that they can be moved on trailers, trains, or ships and then reassembled at the new location. When assembled, the wheel loader 1 is approximately 50 feet wide, 150 feet long and 50 feet high. The dimensions listed above are to help understand the design of this machine and can vary considerably.

The bases 100 and 200 of the wheel loader 1 are made from 2" thick, high carbon steel plates 12 feet in height and 40 feet in length and held in place with 6-8" diameter shafts 160a, 160b, 160c, 160d, 160e, 160f, 260a, 260b, 260c, 260d, 260e and 260f (referred collectively as 160, 260), 50 feet long with nuts 161a, 161b, 161c, 161d, 161e, 161f, 261a. 261b, 261c, 261d, 261e and 261f(referred collectively as 161, 261) on each end and steel spacers with 2" wall thickness between the 2" plates on the shafts 160, 260. By forming the bases 100 and 200 out of steel plates held in place with shafts, nuts and spacers, the wheel loader of the present invention can be easily disassembled into smaller parts not more than 8 feet wide. This allows for easy transport of the constituent parts. A typical tractor trailer on the highway has an 8 foot width cargo section, allowing the disassembled wheel loader to be transported using ordinary tractor trailers. This eliminates the need for especially wide trucks where special permission needs to be granted before transport. In contrast, the LeToureau L-2350 is of a welded construction and can not be disassembled into smaller parts for transport. As a result, transport of the L-2350 is very cumbersome.

Attached to bases 100, 200 are the proximal ends of dipper arm arrangements 130, 230, each dipper arm arrangement having 3 dipper arms 130a, 130b, 130c, 230a, 230b and 230c made out of 2 inch high carbon steel plates welded together in a box beam design, 2 feet wide, 8 feet high and approximately 50 feet long, anchored to the bases 100 and 200 respectively. The proximal ends of each dipper arm arrangements 130, 230 are attached to a rear portion of the respective bases 100, 200 while the distal ends of dipper arm arrangements 130, 230 are attached to the bucket arrangements 120, 220 at round shafts 122 and 222 respectively. Each of the six dipper arms are of a welded box beam construction.

Each base 100 and 200 has two diesel generators 191, 192, 291, 292 (see FIG. 4) and seven wheels 135a, 135b, 135c, 135d, 135e, 135f, 135g, 235a, 235b, 235c, 235d, 235e, 235f and 235g (referred collectively as 135, 235), each wheel having an electric gear reduction electric motor within. It is to be appreciated that the bases 100, 200 of wheel loader 1 of the present invention can have more or fewer wheels and still be within the scope of the present invention. Each base 100, 200 also has two electrically driven hydraulic pumps 193, 293 (see FIG. 4) to operate hydraulic cylinders 140a, 140b, 140c, 240a, 240b, 240c, 170a, 170b, 170c, 270a, 270b, 270c (referred to collectively as 140, 240 and 170, 270) to raise and lower the dipper arm arrangements 130, 230 between a low position and a high position and to pivot the bucket arrangements 120, 220 to allow the contents thereof to be dumped. Hydraulic cylinder 140a raises and lowers dipper arm 130a, hydraulic cylinder 140b raises and lowers dipper arm 130b, and hydraulic cylinder 140c raises and lowers dipper arm 130c etc. The hydraulic pumps 193, 293 are arranged on the deck of the bases 100, 200. The hydraulic pumps 193, 293 may be driven directly by diesel engines 191, 291 or may be driven by an alternator 192, 292 that is in turn driven by a diesel engine 191, 291. An alternator is preferred over use of a generator since a generator produces DC electricity which has more limited control speeds over an alternator that produces AC power. It is to be appreciated that the present invention is in no way limited to 2 hydraulic pumps per unit (4 per wheel loader) but can include a different number and still be within the scope of the present invention.

In the present invention, the hydraulic pumps 193, 293 are connected to each of the hydraulic cylinders 140, 240, 170, 270 by hoses. It is to be appreciated that hydraulic cylinders 140a, 140b and 140c operate in unison, hydraulic cylinders 240a, 240b and 240c operate together in unison, hydraulic cylinders 170a, 170b and 170c operate together in unison and hydraulic cylinders 270a, 270b and 270c operate in unison. For all of these groups of hydraulic cylinders to operate in unison, an equal pressure must be applied to each hydraulic cylinder in the group. This could be achieved by a common connection of the hoses leading to the hydraulic cylinders of a group.

In the present invention, the first set of hydraulic cylinders 140, 240 are used to raise and lower the dipper arm arrangements 130, 230. A hydraulic cylinder of the first set 140, 240 will be discussed more fully later on in conjunction with FIGS. 5A and 5B. In FIG. 1, the left unit 10 has the dipper arm arrangement 130 lowered to an at grade position and the right unit 20 has the dipper arm arrangement 230 raised to the high position. The first set of hydraulic cylinders 140, 240 are used to move the dipper arm arrangements 130, 230 between these two positions. The second set of hydraulic cylinders 170, 270 operated by the hydraulic pumps 193, 293 are used to pivot each bucket arrangement 120, 220 between the transport cargo position as in unit 10 of FIG. 1 and the dump position as per unit 20 of FIG. 1. A detailed description of the second set of hydraulic cylinders 170, 270 will be discussed later in conjunction with FIGS. 6A and 6B.

Figure 2:
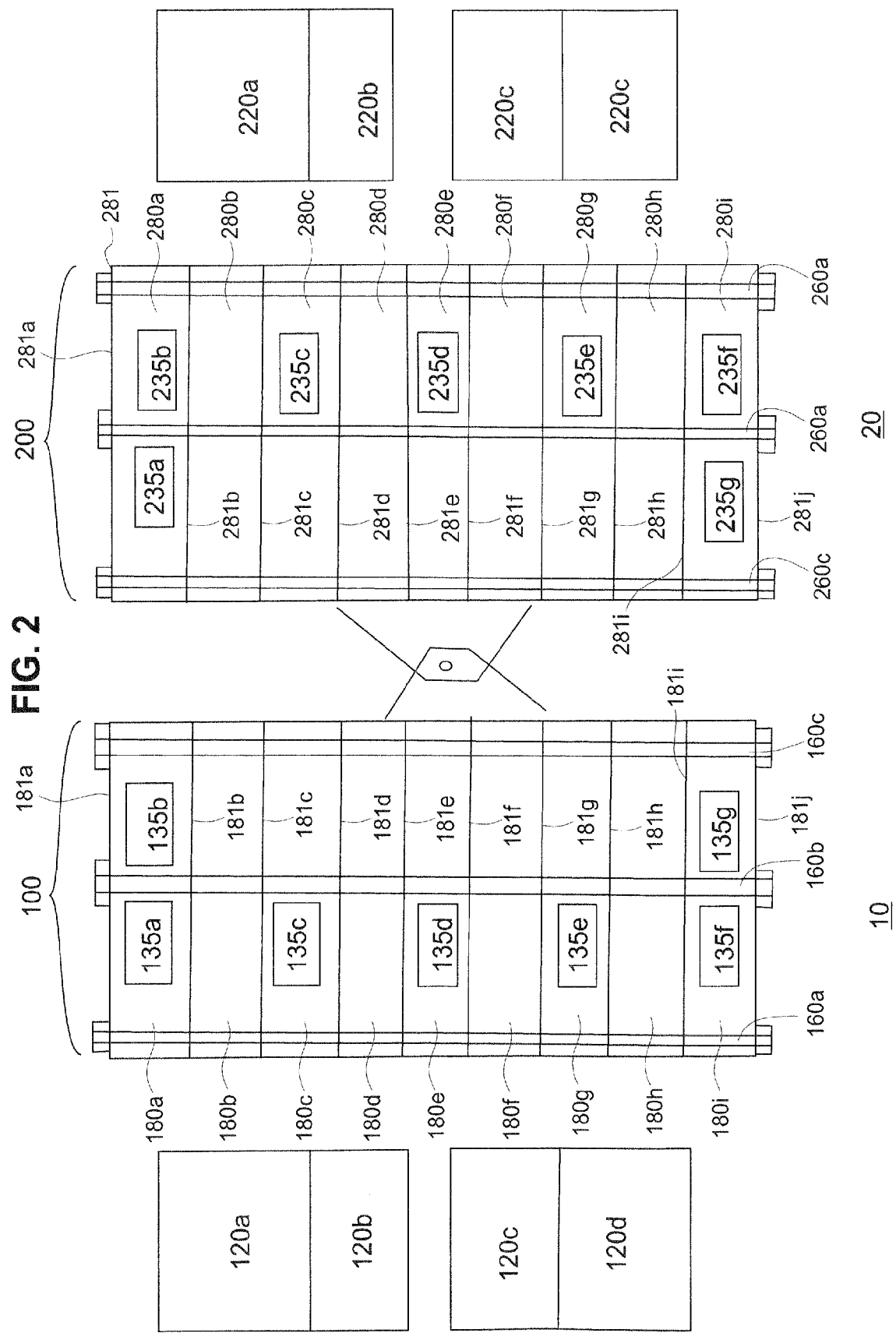
FIG. 2 is a view of an underside of the wheel loader of FIG. 1 according to an embodiment of the present invention.

Turning now to FIG. 2, FIG. 2 illustrates an underside of wheel loader 1. As can be seen, each unit 10 and 20 has seven wheels 135a, 135b, 135c, 135d, 135e, 135f, 135g, 235a, 235b, 235c, 235d, 235e, 235f and 235g (referred collectively as 135, 235), but the present invention is in no way so limited, as more or fewer wheels can be present per unit and still be within the scope of the present invention. Each wheel 135, 235 has an electric gear reduction electric motor within. Each wheel has a planetary gear construction so that when power is cut to a particular wheel by an open circuit, a frictional force remains in said wheel. Each wheel 135, 235 is 4 feet wide and 12 feet in diameter. With 14 wheels per wheel loader 1 or 7 wheels per unit 10, 20, the wheel loader 1 of the present invention has improved traction and less wheel skipping compared to the L-2350 where only 4 wheels are present. The bucket arrangement design and the wheel design of the wheel loader 1 of the present invention provides an ideal machine for coal mining, strip mining and oil sand mining where a large capacity can be achieved while maintaining excellent traction, especially on a level ground.

The units 10 and 20 of the wheel loader 1 are fastened together end to end via pivot 30. Pivot 30, along with engaging and disengaging ones of the electric motors in the wheels 135 and 235 on the left or right side of each unit 10 and 20, allow for steering of the wheel loader 1. Since there are planetary gears in each wheel 135, 235, when a wheel is disengaged by an open circuit, the disengaged wheel has frictional resistance. When the wheel loader 1 wants to turn left, the three leftmost wheels 135e, 135f and 135g of unit 10 and the three right-most wheels 235e, 235f and 235g of unit 20 are disengaged by cutting electric power thereon (i.e. open circuit). Similarly, when wheel loader 1 wants to turn right, wheels 135a, 135b, 135c, 235a, 235b and 235c are disengaged.

The steering ends of the two bases include of 4 spools with a height of 2 feet 4" each, with 8" bushed holes with flanges on each end, 29" in diameter and 2" thick. 4, 2 feet channels with 8" flanges bolted to the spools, with 2" steel deck plates bolted to the channels' 8 inch shafts with threaded nuts on each end bolted the 4 spools together. This machine will turn right or left 90 degrees.

Figure 4:
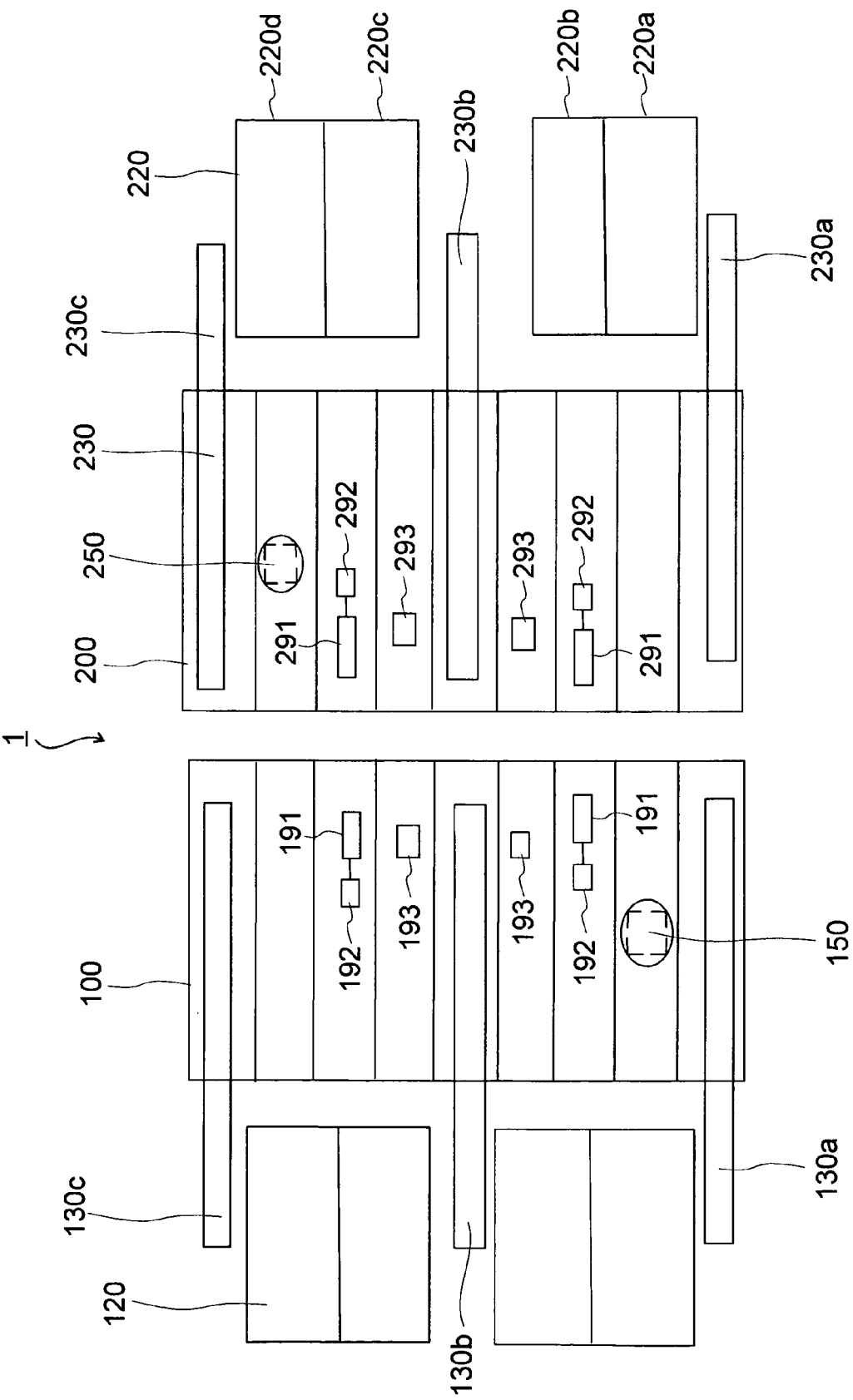
FIG. 4 is a view of a top side of the wheel loader of FIG. 1 according to an embodiment of the present invention.

FIGS. 2 and 4 also illustrates the construction of the bases 10, 20 and how they are used to accommodate the dipper arm arrangements and the wheels. Each of base 10, 20 is shown to have 10 parallel plates drawn horizontally in FIGS. 2 and 4. This results in nine spaces therebetween for each base. For example, unit 10 has base 100 which has steel plates 181a, 181b, 181c, 181d, 181e, 181f, 181g, 181h, 181i and 181j. Each of these carbon steel plates are two inches thick, are perforated by holes to accommodated shafts 160a, 160b, 160c, 160d, 160e and 160f and nuts 161a, 161b, 161c, 161d, 161e and 161f to hold the sleeves, shaft and steel plates in place. Likewise, unit 20 has base 200 which has steel plates 281a, 281b, 281c, 281d, 281e, 281f, 281g, 281h, 281i and 281j. Each of these carbon steel plates are two inches thick, are perforated by holes to accommodated shafts 260a, 260b, 260c, 260d, 260e and 260f and are bounded by nuts 261a, 261b, 261c, 261d, 261e and 261f. Sleeves are arranged between the plates, with the shafts running within the sleeves. The length of the sleeves dictate the spacing between two adjoining steel plates. The sleeves have a 2 inch wall thickness with a 12 inch diameter having an 8 inch diameter hole therein. Nuts are arranged where the shafts emerge from the side most steel plates 181a, 181j, 281a and 281j to fasten the shafts to the steel plates with the sleeves therebetween. Between plates 181a and 181b is space 180a, between plates 181b and 181c is space 180b, and so on until between plates 181i and 181j is space 180i. Similarly, in base 200 of unit 20, between plates 281a and 281b is space 280a, between plates 281b and 281c is space 280b, and so on until between plates 281i and 281j is space 280i. By using the shaft, sleeve, nut and steel plate design to construct the bases 100, 200, bases 100, 200 are easily disassembled into pieces less than 8 feet wide suitable for transportation using ordinary tractor trailers. In contrast, the base of the L-2350 is of a welded design and thus can not be disassembled.

It is to be appreciated that spaces 180c, 180g, 280c, and 280g must be sufficiently wide enough to accommodate the wheels 135c, 135e, 235c and 235e respectively. Since each wheel is 4 feet wide, the spaces 180c, 180g, 280c and 280g must be at least 4 feet wide. It is to be further appreciated that the spaces 180a, 180e, 180i, 280a, 280e and 280i must be sufficiently wide to accommodate both 1) the dipper arms 130a, 130b, 130c, 230a, 230b and 230c respectively as 2) wheels 135a and 135b, 135d and 135f and 135g, 235a and 235b, 235d and 235f and 235g respectively. Thus, when the dipper arm arrangements 130 and/or 230 are lowered, the dipper arms will fit unobstructed between ones of the steel plates that make up the bases 100 and 200. Spaces 180b, 180d, 180f, 180h, 280b, 280d, 280f and 280h do not have to accommodate either of the dipper arms or the wheels and can be designed to be of any width, provided that the total width of the wheel loader is 50 feet.

Figure 3:
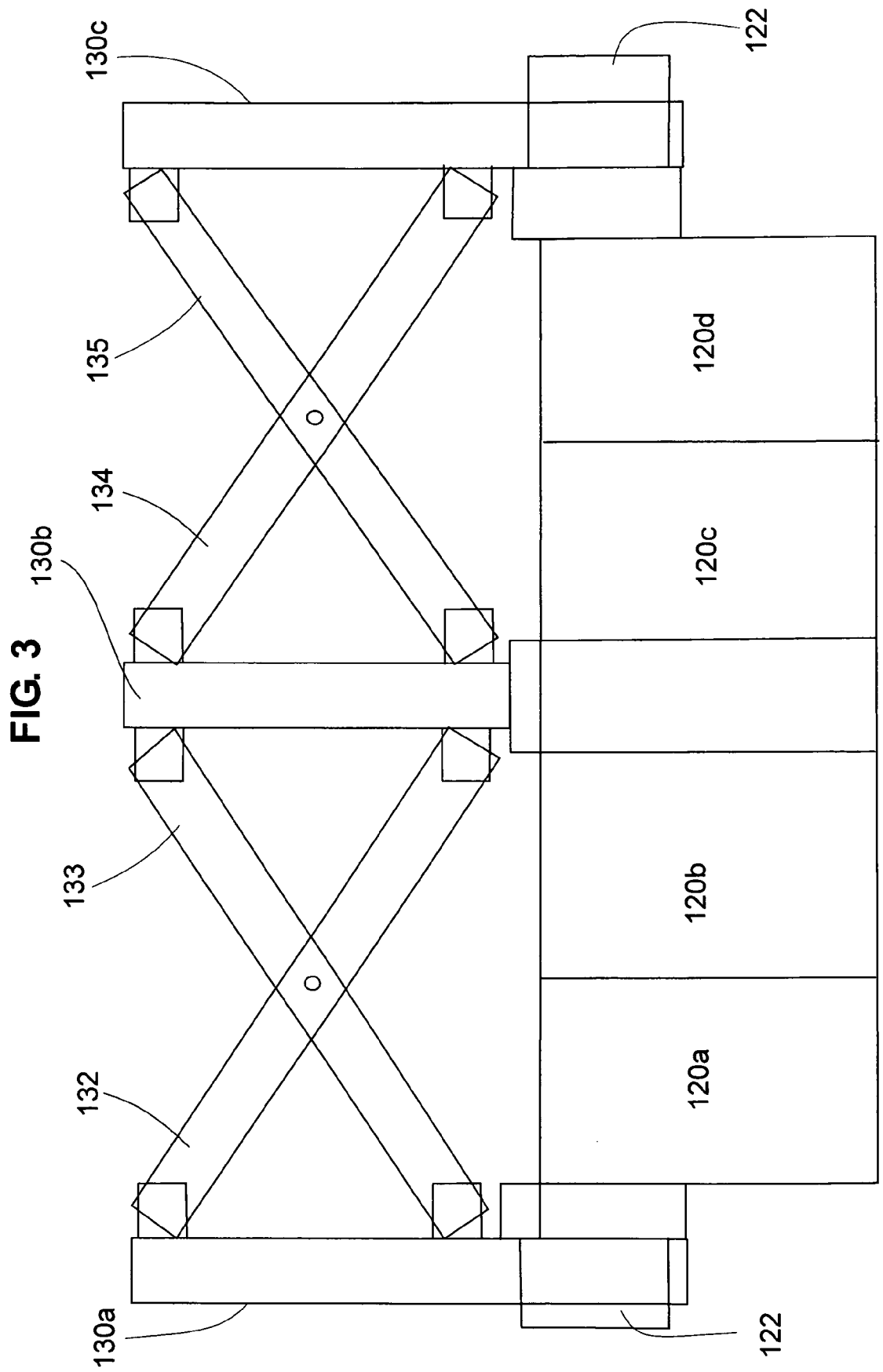
FIG. 3 is a front view of a wheel loader of FIG. 1 facing a bucket arrangement according to an embodiment of the present invention.

As illustrated in FIG. 3, bucket arrangement 120 is illustrated to have 4 bucket units 120a, 120b, 120c, 120d (it is assumed that bucket arrangement 220 has a similar arrangement as bucket arrangement 120), each bucket unit having a capacity of 37.50 cubic yards, which results in a total capacity of 300 cubic yards for the entire wheel loader 1. This compares with the 85 cubic yard capacity of the L2350 for coal. It is to be appreciated that the wheel loader 1 of the present invention can be modified to include fewer or more bucket units than 4 per unit or 8 per wheel loader and still be within the scope of the present invention. The bucket units are bolted together side by side, with 8" shafts and 2" in diameter bolts. Each bucket arrangement 120, 220 can be disassembled into their constituent bucket units for transport. Disassembled, each bucket unit 120a, 120b, 120c, 120d is 8 feet wide, 25 feet deep, and 11 feet high. One novel aspect of the present invention is that the depth of each bucket unit 120, 220 is very deep, that being 25 feet. This is an enormous size that can accomplish tasks that no earlier wheel loader can accomplish, due to the large depth of each bucket unit.

As illustrated in FIG. 3, cross braces 132, 133, 134 and 135 connect ones of the dipper arms 130a, 130b and 130c together. This cross bracing provides additional stability to the bucket arrangement 120 and the dipper arrangement 130 when the buckets are full of material and the bucket arrangement 120 is raised high in the air.

It is to be appreciated that although the width of the entire wheel loader 1 of FIG. 1 is 50 feet, the combined width of the four buckets is only 32 feet. This is because of the need to accommodate dipper arm 130b between bucket units 120b and 120c as well as to accommodate the dipper arms 130a and 130c at either end and the nuts attached thereto.

Each bucket unit is of a welded design and therefore they can not be further disassembled. Since each bucket unit is only 8 feet wide, the bucket units can be easily be transported using ordinary tractor trailers. The bucket arrangements 120, 220 can be removed and replaced with dozer blades or crane booms. When a crane boom is desired, the dipper arm arrangements 130, 230 must first be removed at their proximal ends from their respective base units 100, 200.

As previously stated, the design of the wheel loader 1 according to the present invention is in no way limited to 300 cubic yards capacity of the bucket arrangements 120 and 220. The design of the present invention can be used to construct larger or smaller machines by increasing or decreasing 1) the size or number of bucket units, 2) the size or number of wheels, 3) the number of diesel generators, 4) the width, 5) the length or 6) the height of the machine and others. It is to also be appreciated that the payload weight capacity of the wheel loader is dependent upon the number of hydraulic pumps 193, 293 used and the cylinder size (i.e., cylinder diameter) employed in each of the sets of hydraulic cylinders.

Wheel loader 1 includes two control towers or cabs 150, 250, one for each unit 10, 20 respectively. This machine can be controlled from either of the control towers 150, 250, or the 2 units can be disengaged from each other and controlled separately from only one cab. When disengaging unit 20 from unit 10, in addition to decoupling coupler 30, the hydraulic lines (hoses) as well as the electrical lines between the two units need to also be separated. This includes any control lines from the disengaged cab of one unit to the engines, pumps and cylinders of the other unit.

The operating cabs 150, 250 are mounted on the deck of the bases 100, 200 of the two units 10 and 20 respectively. To do so, 6"×6"×1" angles 40 feet in length, with cross bracing on 4 sides are arranged on the decks of the bases 100 and 200. Then, a cab baseplate is arranged on and bolted to the top of these angles (or legs) to allow for easy disassembly. The cab base plate contains a V-belt groove around the circumference. There is an 8 inch hole in the center of each cab base plate to enable each of the cabs 150 and 250 respectively to rotate with respect to their respective base units 100 and 200 to enable the operator in the cab to obtain a better view. The operator's cabs 150, 250 are mounted on the top of the cab base plates and an 8" shaft of the cab floor plate of the cab is inserted into the 8 inch hole of the cab base plate with nuts on each end. The cabs are about 40 feet off the ground. The height and the rotatability of cabs 150, 250 of the present invention is necessary to provide an operator with a good view of such a large wheel loader 1 that includes two units 10 and 20.

The operator's cab is approximately 8 feet in diameter and has a cab floor plate that is 2" thick and 8 feet in diameter with a shaft that goes through the hole at the center of the cab base plate. The cab has a catwalk to allow for entry to the cab and to clean the glass of the cab. The glass is shatter proof glass and is on all sides of the cab. There is an electric motor with a small V-pulley attached to the cab floor-plate with a V belt attached to the V-pulley and the base-plate of the tower to rotate the operator's cab clockwise or counterclockwise with respect to an underlying base unit to give the operator a clearer view. The cab rotates so that the cab floor plate rotates with respect to the cab base plate about the shaft. To rotate the cab, an operator within the cab activates an electric switch, allowing the cab to rotate with respect to the cab base plate and the base of the unit. By doing so, the operator within the cab can get a clearer view of the bucket arrangement of the other unit or a clearer view of where the wheel loader is turning.

There are 2 deluxe seats in the cab, one for the operator and one for a person to learn how to operate the machine. The cab enclosure has a top cover and is both air-conditioned and heated. This wheel loader 1 is joy-stick system controlled. The operator's cab can have a refrigerator or other conveniences. The wheel loader 1 is also equipped with an elevator to raise the operator or other people from the deck of the machine to the operator's cab. This elevator overcomes the need for the operator to climb up or down a ladder.

Turning now to FIG. 4, FIG. 4 is a view of a top view of the wheel loader of FIG. 1. It is to be understood that the arrangement illustrated in FIG. 4 is just one possible arrangement as other arrangements are possible and are still within the scope of the present invention. As illustrated in FIG. 4, base unit 100 has on its top deck one cab 150, two diesel engines 191, two alternators 192, one for each diesel engine 191 and two hydraulic pumps 193, one for each alternator 192. Similarly, on top of base unit 200 is one cab 250, two diesel engines 291, two alternators 292, one for each diesel engine 291, and two hydraulic pumps 293, one for each alternator 292. As can be seen from FIG. 4, because of the dipper arms 130a, 130b, 130c, 230a, 230b and 230c, and how they interrelate with the steel plates that make up each of the base units, none of the cabs 150, 250, the diesel engines 191, 291, alternators 192, 292 or the hydraulic pumps 193, 293 can be arranged at the geometric center of the tops of either one of the base units 100, 200.

As is illustrated in FIG. 4, each of the cab units 150, 250 are off to one side of the tops of the base units 100, 200. In addition, a diesel engine 191, 291, an alternator 192, 292 and a hydraulic pump 193, 293 are all located in close proximity with each other. Each diesel engine 191, 291 drives an alternator 192, 292 which drives a hydraulic pump 193, 293, which in turn drives one or more hydraulic cylinders. As also can be seen, each cab unit 150, 250 is small in comparison to the size and dimensions of each base unit 100, 200. Each base unit is about 48 feet wide excluding the nuts 161, 261. Each base unit 100, 200 is also about 40 feet long. Each cab unit 150, 250 is only 8 feet in diameter, which is about one-fifth the length and about one-sixth the width of the top of the base unit 100, 200. It is to be understood that the location, arrangement and number of diesel engines, alternators, hydraulic pumps and the location of the cabs can vary from that of FIG. 4 and still be within the scope of the present invention, and that the arrangement illustrated in FIG. 4 is just one possible arrangement.

Turning now to FIGS. 5A and 5B, FIGS. 5A and 5B are views of an individual hydraulic cylinder 140a, 140b or 140c used to lift the dipper arms 130a, 130b and 130c. FIG. 5B is a view of the same hydraulic cylinder 140 but rotated by 90 degrees from FIG. 4A. At the right end of FIGS. 5A and 5B is the clevis 141. Clevis 141 is attached a shaft 160d in base 100 that is both the foremost and the topmost of all the shafts 160 in the base. A trunnion 142 attaches to a dipper arm 130a, 130b, 130c at a location on the dipper arm to be discussed later in conjunction with FIG. 7. Piston 143 is inserted into cylinder 144. The degree upon how much of piston 143 is inserted into cylinder 144 controls the elevation of the dipper arm arrangement 130 (consult FIG. 1 and compare cylinder 240 and dipper arrangement 230 with cylinder 140 and dipper arrangement 130). Although not shown, hydraulic cylinder 140 is driven by a hydraulic pump mounted on the deck of base 100. Hydraulic lines or hoses connect the hydraulic pump to hydraulic cylinders 140a, 140b and 140c.

Figure 6A:
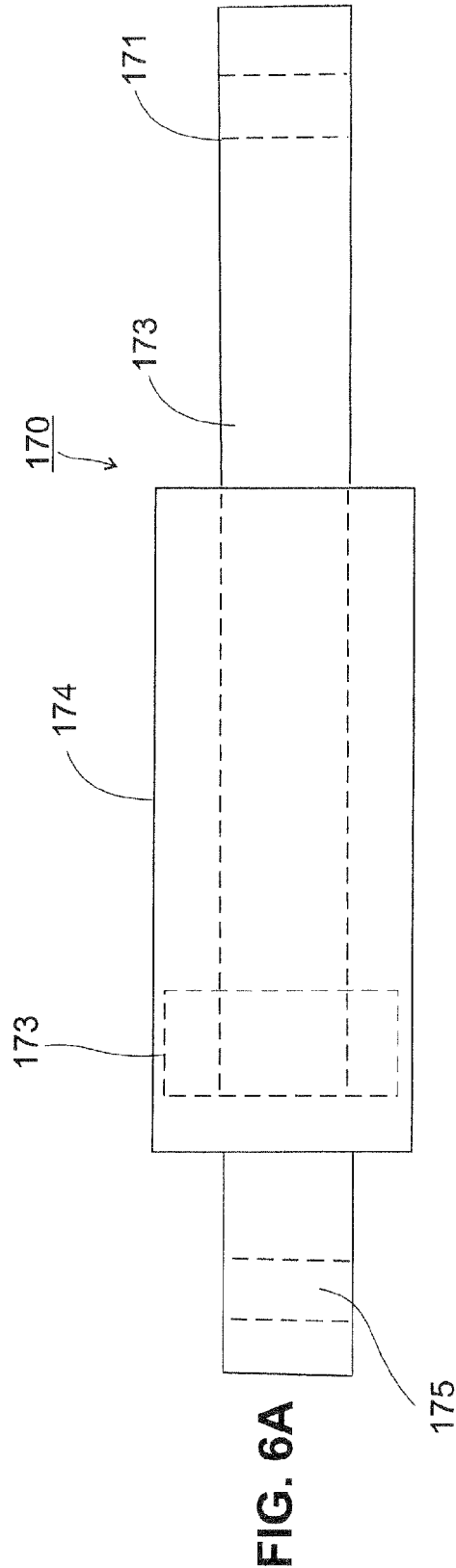
FIGS. 6A and 6B are views of the hydraulic cylinders used to pivot the bucket arrangement of the wheel loader of FIG. 1 according to an embodiment of the present invention.
Figure 6B:
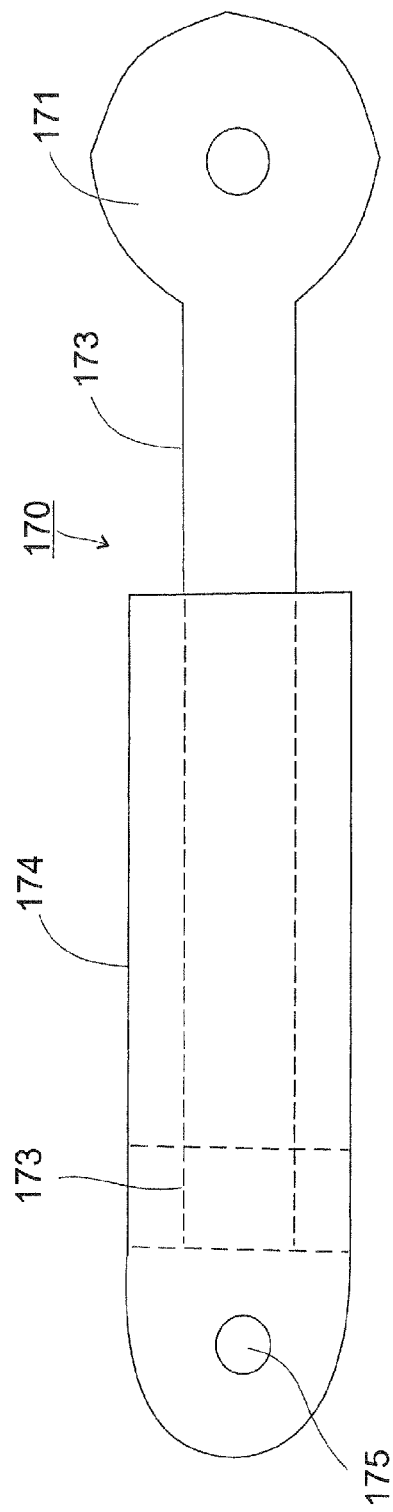

Turning now to FIGS. 6A and 6B, FIGS. 6A and 6B are views one of the hydraulic cylinders 170a, 170b, 170c used to rotate and dump bucket arrangement 120. FIG. 6B is a view of the same hydraulic cylinder 170 of FIG. 6A but rotated by 90 degrees from FIG. 6A. At the right end of FIGS. 6A and 6B is the clevis 171. Clevis 171 is attached to a dipper arm 130 at a location to be discussed later in conjunction with FIG. 6. Another clevis 175 at an opposite end of the hydraulic cylinder 170 is attached to shaft 127 running across a top of the bucket arrangement 120. Piston 173 is inserted into cylinder 174 during the operation of hydraulic cylinder 170. The degree upon how much of piston 173 is inserted into cylinder 174 controls whether or not the buckets dump or carry their load. Rotation of the bucket arrangement via hydraulic cylinder is achieved by displacing shaft 127 on bucket arrangement 120 to cause bucket arrangement to rotate about shaft 122 (see FIG. 1 and compare bucket arrangement 220 with bucket arrangement 120). Although not shown, hydraulic cylinder 170 is driven by a hydraulic pump mounted on the deck of base 100. Hydraulic lines or hoses connect the hydraulic pump to hydraulic cylinder 170.

Figure 7:
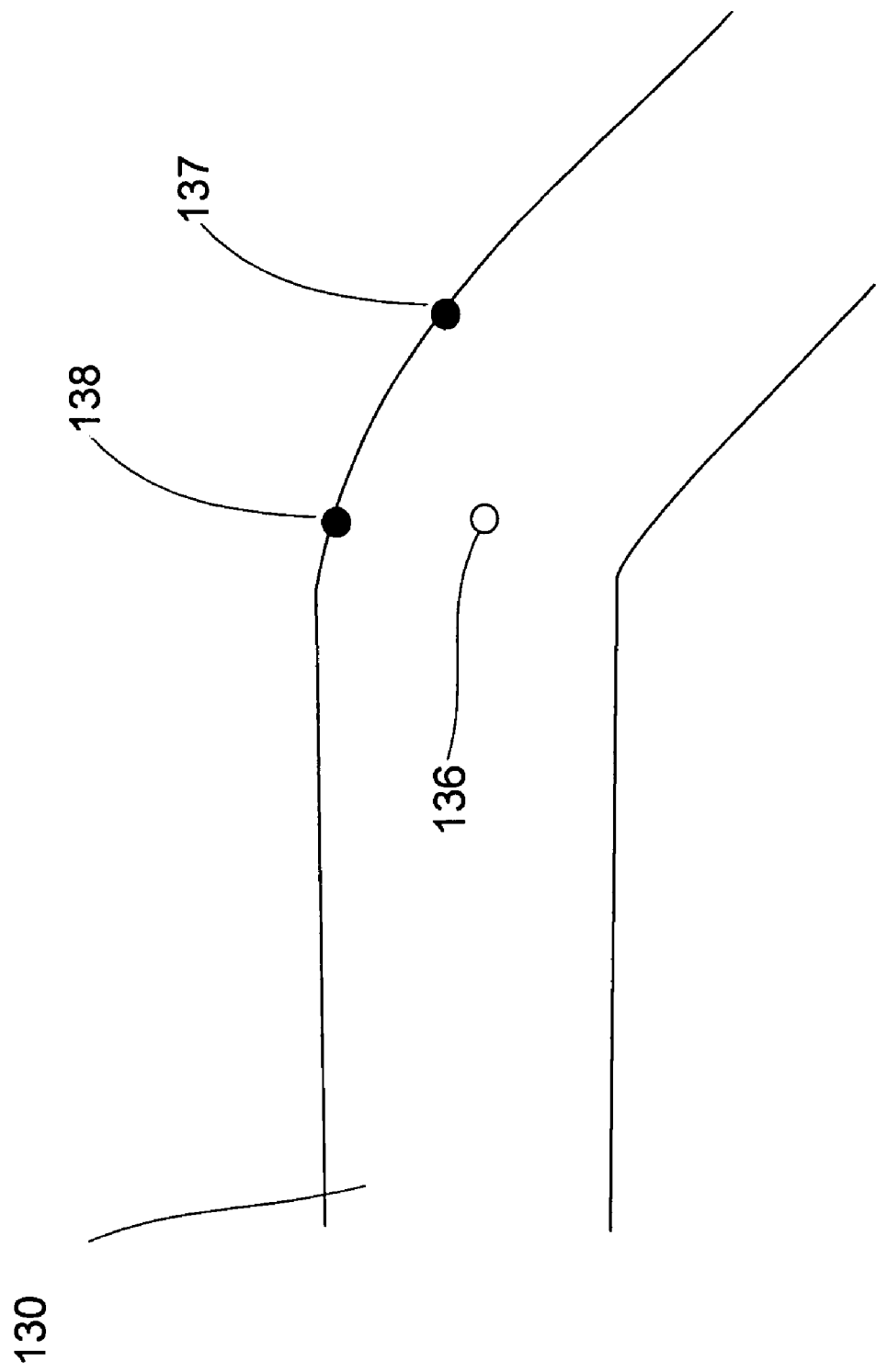
FIG. 7 is a view of a portion of a dipper arm showing where the hydraulic cylinders attach thereto.

Turning now to FIG. 7, FIG. 7 illustrates a portion of a dipper arm in the vicinity of where hydraulic cylinders 140 and 170 are attached thereto. Reference numeral 136 illustrates the location where the trunnion 142 of hydraulic cylinder attaches to the dipper arm 130 and reference numerals 137 and 138 are at locations where clevis 175 of hydraulic cylinder 170 attaches to dipper arm 130. As seen in FIG. 7, hydraulic cylinder 140 is attached at a center of the frontmost bend of dipper arm 130 and hydraulic cylinder 170 attaches to an edge near the foremost bend of the dipper arm. It is to be appreciated that the locations where each of hydraulic cylinders 140 and 170 attach to the dipper arm 130 need to be chosen so that the operation of one hydraulic cylinder 140 does not interfere with the operation of the other hydraulic cylinder 170 and vice versa. Another design consideration is that the thickness of the steel plate of the dipper arm 130 in the vicinity of the connection points 136, 137 and 138 must be made thicker than the normal 2 inches in order to fortify the strength of the dipper arm in the vicinity of where the hydraulic cylinders attach thereto to withstand the forces thereof.

While the present invention has been particularly shown and described with reference to exemplary embodiments thereof, it will be understood by one of ordinary skill in the art that various changes in form and details may be made therein without departing from the spirit and scope of the present invention as defined by the following claims.

The invention claimed is:

1. A wheel loader, comprising a first unit and a second unit being detachably attached to each other by a coupler pivot, each of the first unit and the second unit includes:
a base unit;
a cab arranged on the base unit;
a plurality of wheels arranged underneath the base unit;
a bucket arrangement; and
a dipper arm arrangement including a plurality of dipper arms, each of the dipper arms having a proximal end and a distal end, the proximal end of each of the dipper arms being attached to the base unit and the distal end of the dipper arms being attached to the bucket arrangement, wherein each bucket arrangement comprises a plurality of bucket units, each bucket unit capable of individually functioning as a bucket, each bucket arrangement capable of being disassembled into the corresponding plurality of bucket units, the bucket units of each bucket arrangement being bolted together side by side with shafts and bolts.

2. The wheel loader of claim 1, wherein each bucket arrangement comprises 4 bucket units and being arranged in two pairs separated by one of said dipper arms.

3. The wheel loader of claim 1, each plurality of dipper arms being operated by a corresponding number of hydraulic cylinders driven by a plurality of hydraulic pumps.

4. The wheel loader of claim 1, wherein each of the plurality of wheels of the first and the second units comprises an electric gear reduction motor within.

5. The wheel loader of claim 1, each base unit being 50 feet by 40 feet and being adapted to be disassembled into pieces no more than 8 feet wide, the wheel loader having a combined capacity of the bucket arrangement of the first and second units of 300 cubic yards.

6. The wheel loader of claim 1, each of the first and the second units further comprises a plurality of hydraulic cylinders extending from the dipper arms to the bucket arrangements and adapted to dump a contents of the bucket arrangement.

7. The wheel loader of claim 1, each of the first and the second units further comprises:
a first set of hydraulic cylinders extending from the base unit to the dipper arms and adapted to raise and lower the dipper arms and the bucket arrangement; and
a second set of hydraulic cylinders extending from the dipper arms to the bucket arrangement and adapted to dump contents of the bucket arrangement by rotating the bucket arrangement.

8. The wheel loader of claim 1, the first and the second units each being independently operable from their respective cab upon detachment of said coupler.

9. The wheel loader of claim 1, each bucket unit being 25 feet deep, 8 feet wide and 11 feet high, each bucket arrangement having a capacity of 150 cubic yards.

10. A wheel loader, comprising a first unit and a second unit being detachably attached to each other by a coupler pivot, each of the first unit and the second unit includes:
a base unit;
a plurality of wheels arranged underneath the base unit;
a bucket arrangement; and
a dipper arm arrangement including a plurality of dipper arms, each of the dipper arms having a proximal end and a distal end, the proximal end of each of the dipper arms being attached to the base unit and the distal end of the dipper arms being attached to the bucket arrangement; and
a cab mounted on a top side of the base unit, the cab being rotatable with respect to the base unit, the cab comprising a shaft directly underneath said cab and extending from a bottom of a cab floor plate and into an aperture in a cab base plate arranged on the base unit.

11. The wheel loader of claim 10, the cab being adapted to rotate a complete revolution.

12. The wheel loader of claim 10, the cab rotating without translation.

13. A wheel loader, comprising a first unit and a second unit being detachably attached to each other by a coupler pivot, each of the first unit and the second unit includes:
a base unit;
a cab arranged on the base unit;
a plurality of wheels arranged underneath the base unit;
a bucket arrangement; and
a dipper arm arrangement including a plurality of dipper arms, each of the dipper arms having a proximal end and a distal end, the proximal end of each of the dipper arms being attached to the base unit and the distal end of the dipper arms being attached to the bucket arrangement, each base unit being not less than 50 feet wide and comprising:
a plurality of steel plates arranged in parallel with each other and defining spaces between adjacent ones of the plurality of steel plates, each of said steel plates being perforated by a plurality of apertures;
a plurality of shafts extending through the apertures of each of said plurality of steel plates;
a plurality of sleeves arranged about ones of the plurality of shafts and adapted to maintain a spacing and said spaces between adjacent ones of the plurality of steel plates; and
a plurality of nuts adapted to fasten the shafts to the steel plates with the sleeves arranged therebetween, wherein each of said wheels being arranged within at least a portion of one of said spaces between adjoining ones of said steel plates.

14. The wheel loader of claim 13, wherein ones of said dipper arms being arranged within ones of said spaces between adjacent steel plates upon said bucket arrangement being in a lowered position.

15. The wheel loader of claim 13, each of said plurality of sleeves having an outer diameter greater than a diameter of ones of said plurality of apertures in said steel plates.

16. A wheel loader, comprising two units attached to each other by a coupler pivot, each of said two units includes:
   a base unit;
   a plurality of wheels arranged underneath the base unit;
   a bucket arrangement; and
   a plurality of dipper arms, each of the dipper arms having a proximal end and a distal end, the proximal end of each of the dipper arms being attached to the base unit and the distal end of each of the dipper arms being attached to the bucket arrangement, each unit further including a cab mounted on the base unit, the cab extending not less than 40 feet above a bottom of the wheels, the bucket arrangement being on an opposite side of a corresponding base unit from the coupler pivot, the cab being between the coupler pivot and the bucket arrangement.

17. The wheel loader of claim 16, the bucket arrangement having a capacity of 150 cubic yards, the wheel loader having a bucket capacity of 300 cubic yards.

18. The wheel loader of claim 16, each of said two units being identical to each other and being independently operable.

19. A wheel loader, comprising two units attached to each other by a coupler pivot, each of said two units includes:
   a base unit;
   a plurality of wheels arranged underneath the base unit;
   a bucket arrangement; and
   a plurality of dipper arms, each of the dipper arms having a proximal end and a distal end, the proximal end of each of the dipper arms being attached to the base unit and the distal end of each of the dipper arms being attached to the bucket arrangement, each unit further including a cab mounted on the base, the cab extending not less than 40 feet above a bottom of the wheels, each base unit comprises:
   10 steel plates arranged in parallel with each other and defining 9 spaces between adjacent ones of the 10 steel plates, each of said 10 steel plates being perforated by a plurality of apertures;
   a plurality of shafts extending through the apertures of each of said ten steel plates;
   9 sleeves arranged about ones of the plurality of shafts and adapted to maintain a corresponding distance between adjacent ones of the 10 steel plates to produce ones of said 9 spaces; and
   a plurality of nuts adapted to fasten the shafts to the steel plates with the sleeves arranged therebetween, wherein each of said plurality of wheels being arranged at least partially within one of said 9 spaces, wherein each of said plurality of dipper arms being arranged at least partially within ones of said plurality of 9 spaces upon said bucket arrangement being at a lowered position.

* * * * *